United States Patent
Smith

(10) Patent No.: US 8,480,316 B2
(45) Date of Patent: Jul. 9, 2013

(54) CAMERA MOUNTING APPARATUS AND METHOD

(76) Inventor: Leroy Raymond Smith, Burke, SD (US)

( * ) Notice: Subject to any disclaimer, the term of this patent is extended or adjusted under 35 U.S.C. 154(b) by 178 days.

(21) Appl. No.: 13/114,610

(22) Filed: May 24, 2011

(65) Prior Publication Data

US 2012/0301129 A1    Nov. 29, 2012

(51) Int. Cl.
*G03B 17/00* (2006.01)

(52) U.S. Cl.
USPC .......................................................... 396/427

(58) Field of Classification Search
USPC .............. 396/427, 428, 419; 248/187.1, 156; 206/316.2
See application file for complete search history.

(56) References Cited

U.S. PATENT DOCUMENTS

| | | |
|---|---|---|
| 704,666 A | 7/1902 | Stephens |
| 1,408,900 A | 3/1922 | Miller et al. |
| 1,582,381 A | 4/1926 | Citero |
| 2,375,214 A | 5/1945 | Creedon |
| 5,351,923 A | 10/1994 | Booth, Jr. |
| 5,622,342 A | 4/1997 | Mills |
| 5,649,257 A | 7/1997 | Kempka |
| 5,669,592 A | 9/1997 | Kearful |
| 7,066,662 B2 * | 6/2006 | Cuddeback et al. .......... 396/427 |
| 7,789,574 B2 * | 9/2010 | Broberg ........................ 396/428 |
| 7,832,696 B2 | 11/2010 | Goodman |
| 2008/0107412 A1 * | 5/2008 | Moore et al. .................. 396/427 |
| 2009/0194443 A1 * | 8/2009 | Cuddeback ................ 206/316.2 |

* cited by examiner

*Primary Examiner* — Clayton E LaBalle
*Assistant Examiner* — Linda B Smith
(74) *Attorney, Agent, or Firm* — Etherton Law Group LLC; Sandra L. Etherton

(57) ABSTRACT

A camera mounting apparatus for supporting a camera, having a base member with a front plane and a back plane and a base attached to the front plane of the base member. A pivoting member is connected to the top of the base member about the intersection of a base and a rear member of the pivoting member with a hinge apparatus. An attachment apparatus mounted to the back plane of the base member comprises two rectangular gripping elements for gripping a stanchion-like object.

16 Claims, 15 Drawing Sheets

CAMERA MOUNTING APPARATUS AND METHOD

TECHNICAL FIELD

The subject disclosure relates to mounting brackets, and more particularly relates to an apparatus and method for mounting a camera to a stanchion-like object (e.g., a tree, a T-post) for positioning the camera to capture images of a desired area. The subject disclosure is particularly relevant to mounting a motion-activated camera to a small diameter tree, a T-post or a similar stanchion-like object in order that the camera record images of passing by wildlife in a desired area.

BACKGROUND

By way of background concerning some conventional systems, camera mounting systems can be useful for positioning cameras to take photographs. Camera mounting systems can be used to secure a camera in a more reliable fashion that a person could. Camera mounting systems can also be used to secure a camera in locations or in positions that a person could not achieve.

Cameras come in many configurations and styles. One type of camera is a motion-activated camera (e.g., game camera, game-security camera, animal tracking camera). A popular, but not necessary feature of motion-activated cameras is their motion detection capability. Common configurations can be programmed to take a photograph when motion is detected, or to take a predetermined length of video when motion is detected. One use for this capability can be to scout game animals (e.g., elk, deer, moose).

However, camera mounting systems carry with them a variety of deficiencies. One such deficiency conventionally associated with the use of camera mounting systems is that motion-activated cameras come in many configurations and are often not compatible with mounting system used with other styles of cameras.

Another such deficiency conventionally associated with the use of camera mounting systems is that many camera mounting systems require inserted a threaded portion of the mounting system into a wood surface, such as a tree, making mounting of a motion-activated camera on a metal structure, such as a T-post, difficult.

An even further deficiency conventionally associated with the use of camera mounting systems is that many camera mounting systems require the user to wrap a flexible element around an object, securing the flexible element to a cooperating element or to the mounting system itself, making placement of the mounting system on small diameter objects, such as small trees or T-posts, difficult or impossible.

The above-described deficiencies of today's camera mounting systems are merely intended to provide an overview of some of the problems of conventional systems, and are not intended to be exhaustive. Other problems with the state of the art and corresponding benefits of some of the various non-limiting embodiments may become further apparent upon review of the following detailed description.

SUMMARY

A simplified summary is provided herein to help enable a basic or general understanding of various aspects of exemplary, non-limiting embodiments that follow in the more detailed description and the accompanying drawings. This summary is not intended, however, as an extensive or exhaustive overview. Instead, the sole purpose of this summary is to present some concepts related to some exemplary non-limiting embodiments in a simplified form as a prelude to the more detailed description of the various embodiments that follow.

A camera mounting apparatus for supporting a camera is described, having a base member with a front plane and a back plane and a base attached to the front plane of the base member. A pivoting member is connected to the top of the base member about the intersection of a base and a rear member of the pivoting member with a hinge apparatus. An attachment apparatus mounted to the back plane of the base member comprises two rectangular gripping elements for gripping a stanchion-like object.

These and other embodiments are described in more detail below.

BRIEF DESCRIPTION OF THE DRAWINGS

Various non-limiting embodiments are further described with reference to the accompanying drawings in which:

FIG. 7 is a schematic side view of a camera mounting system, according to an embodiment, illustrating the mounting system mounted on a small tree, wooden post or the like.

DETAILED DESCRIPTION

Overview

Figure 1:
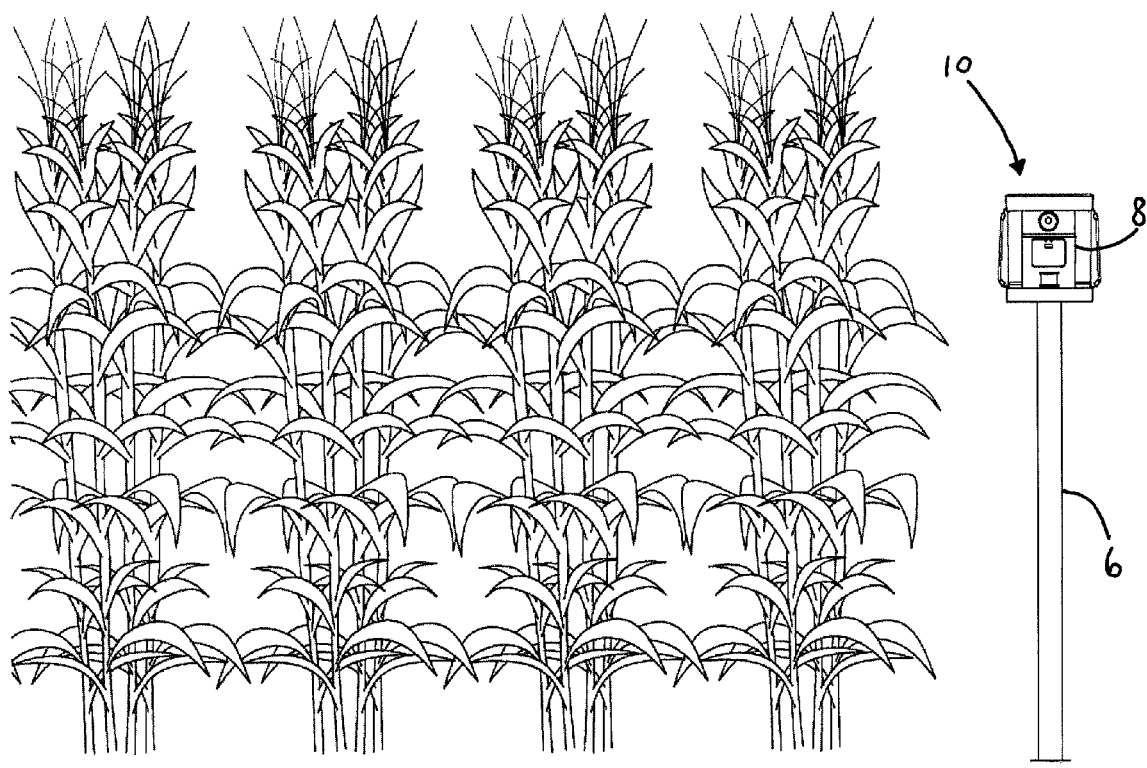
FIG. 1 is a front schematic perspective view of a camera mounting apparatus according to an embodiment with a motion activated camera installed therein.
Figure 2:
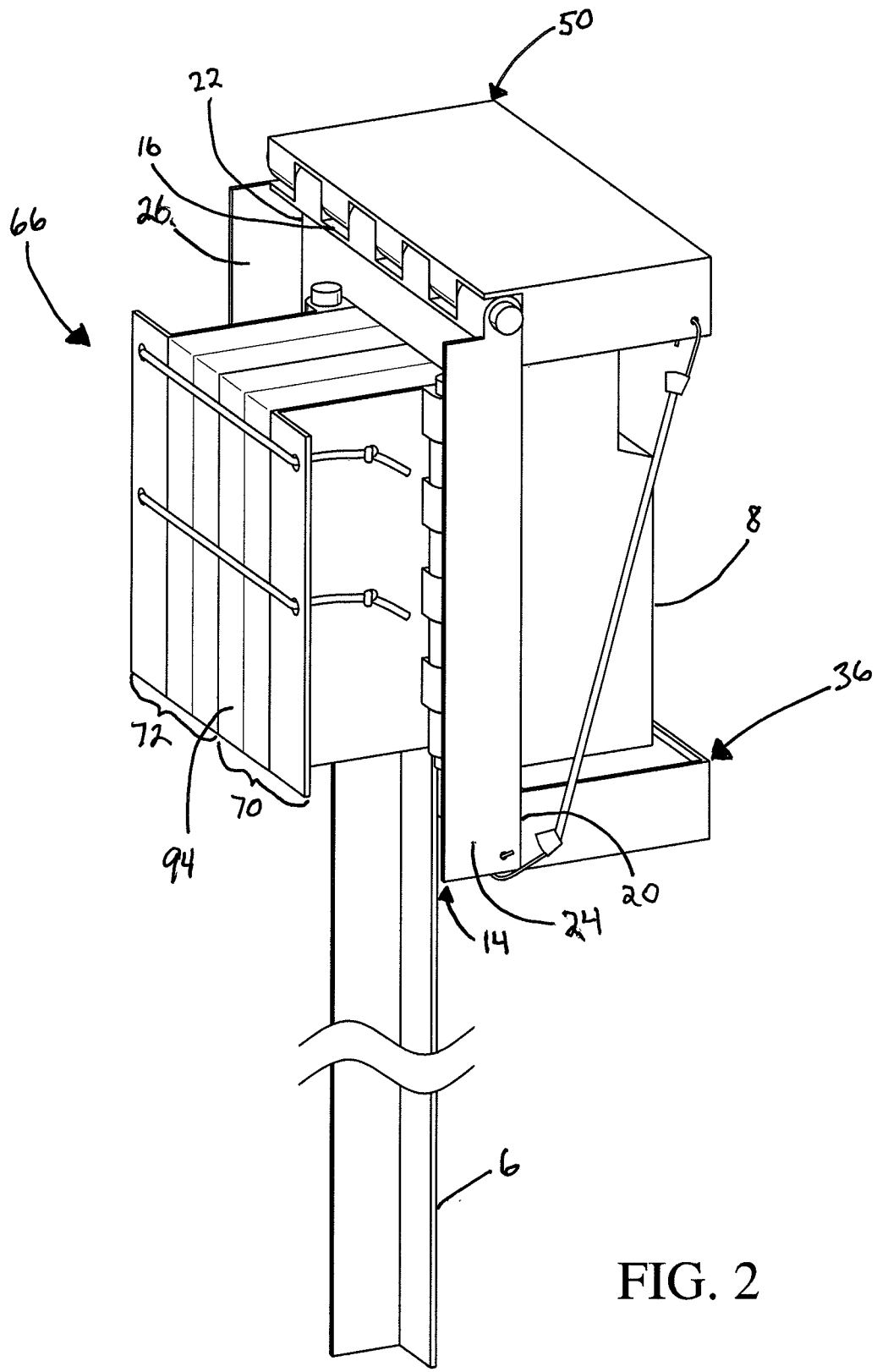
FIG. 2 is a rear schematic perspective view of a camera mounting apparatus according to an embodiment with the mounting apparatus mounted to a T-post.
Figure 3:
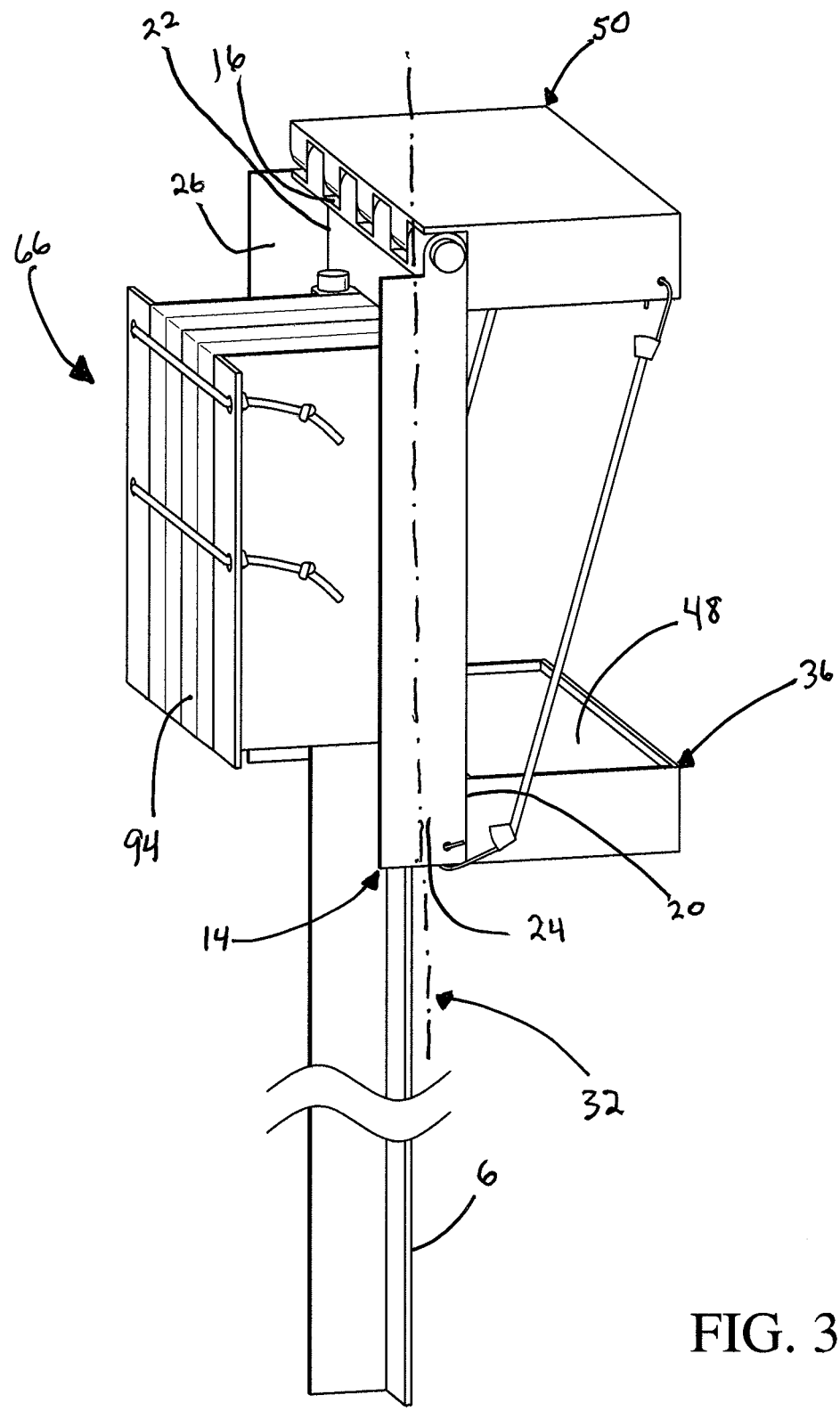
FIG. 3 is a schematic side view of a camera mounting apparatus according to an embodiment without a motion activated camera mounted therein.
Figure 4A:
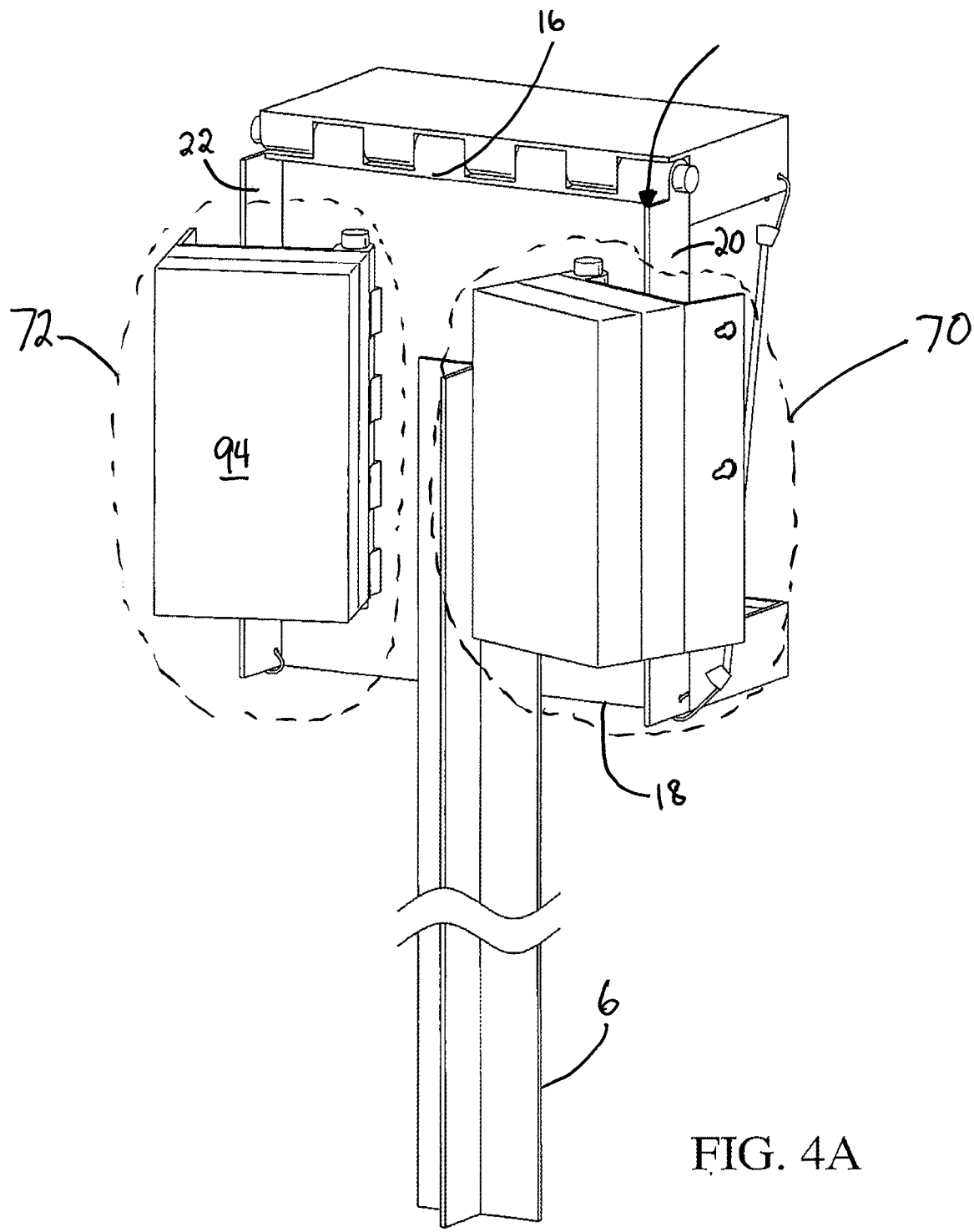
FIGS. 4a through 4d are a series of schematic rear perspective views of the camera mounting apparatus and method according to an embodiment, illustrating a method for installing the apparatus on a T-post.
Figure 4B:
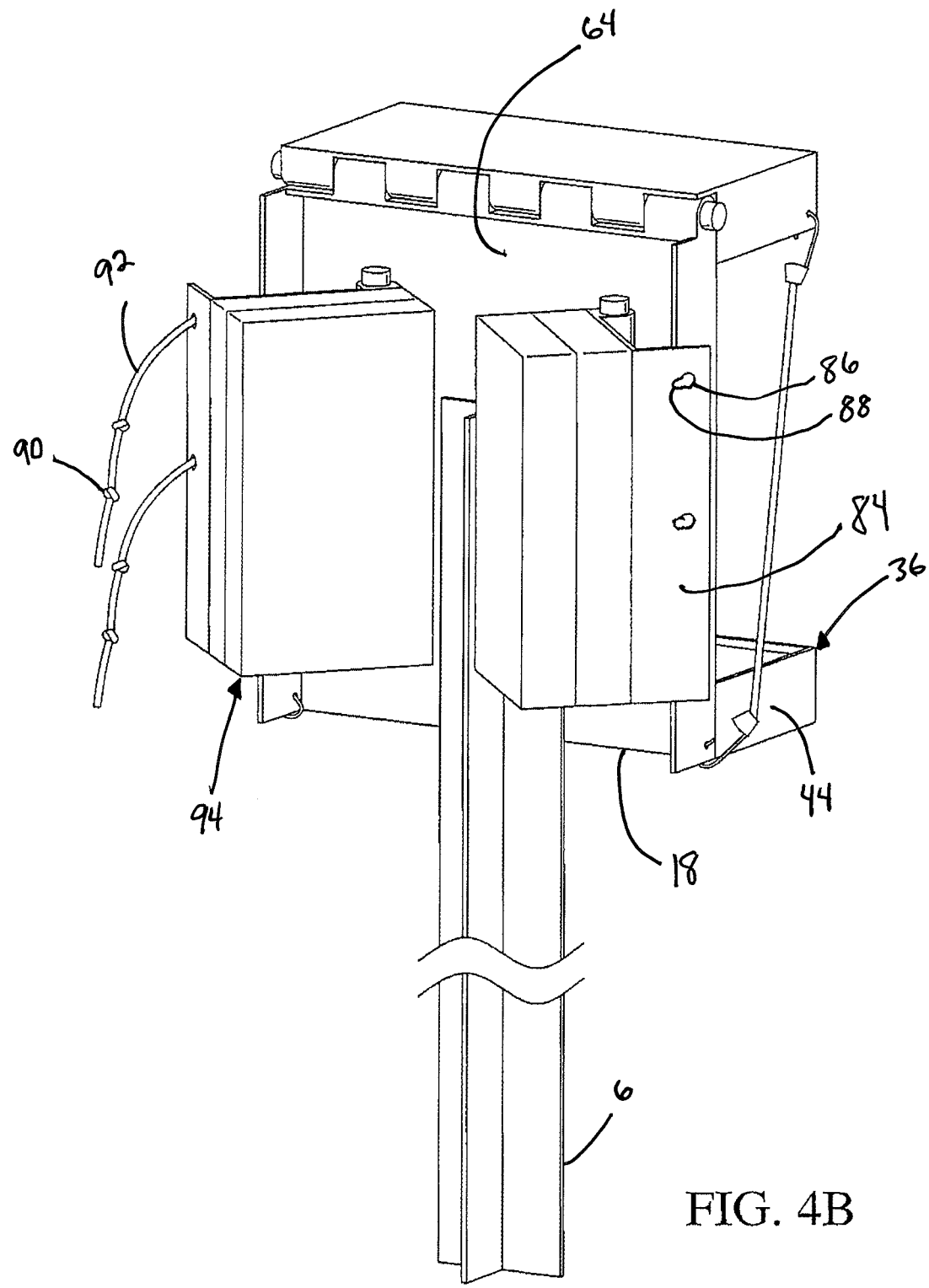
Figure 4C:
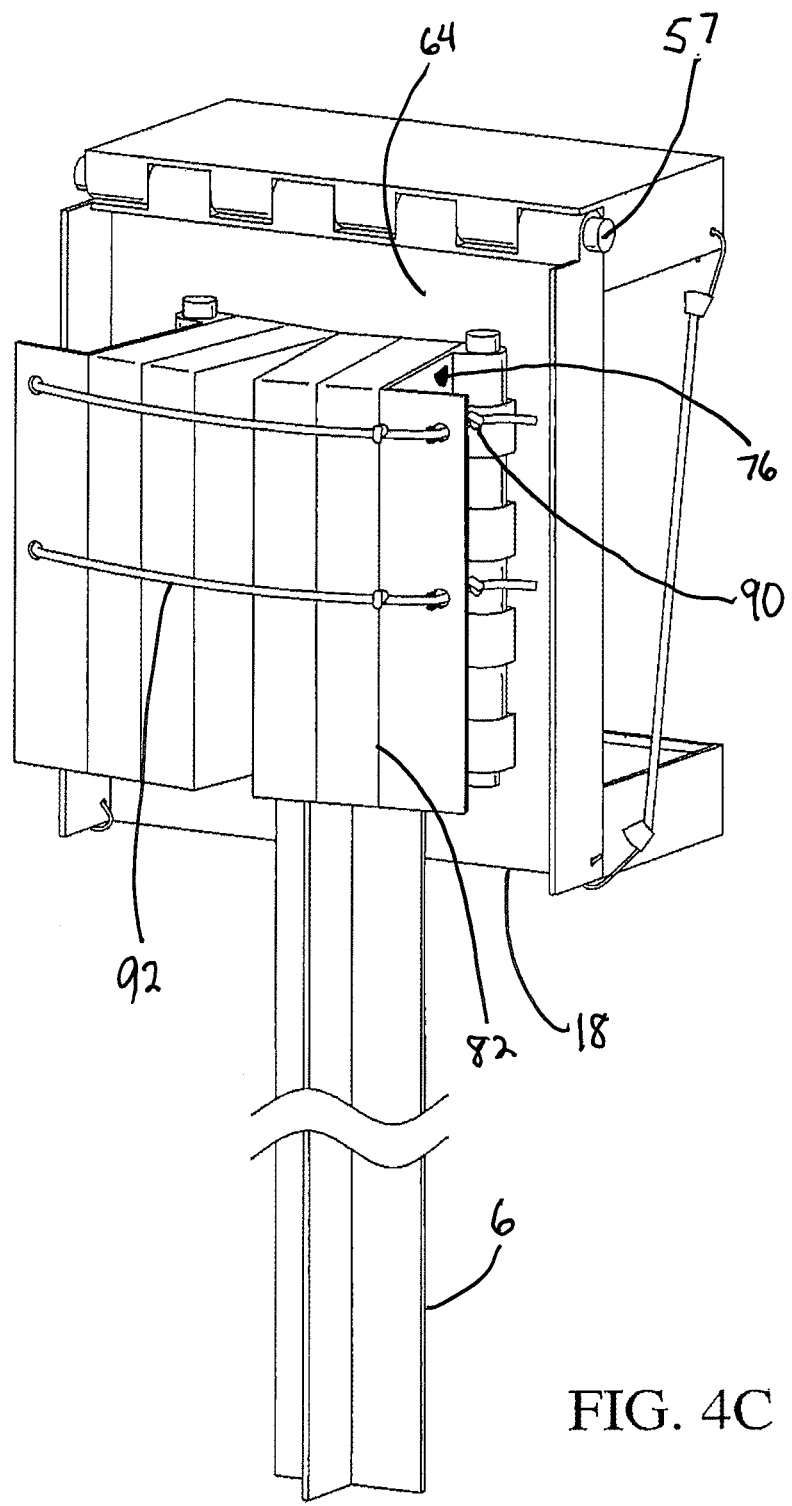
Figure 4D:
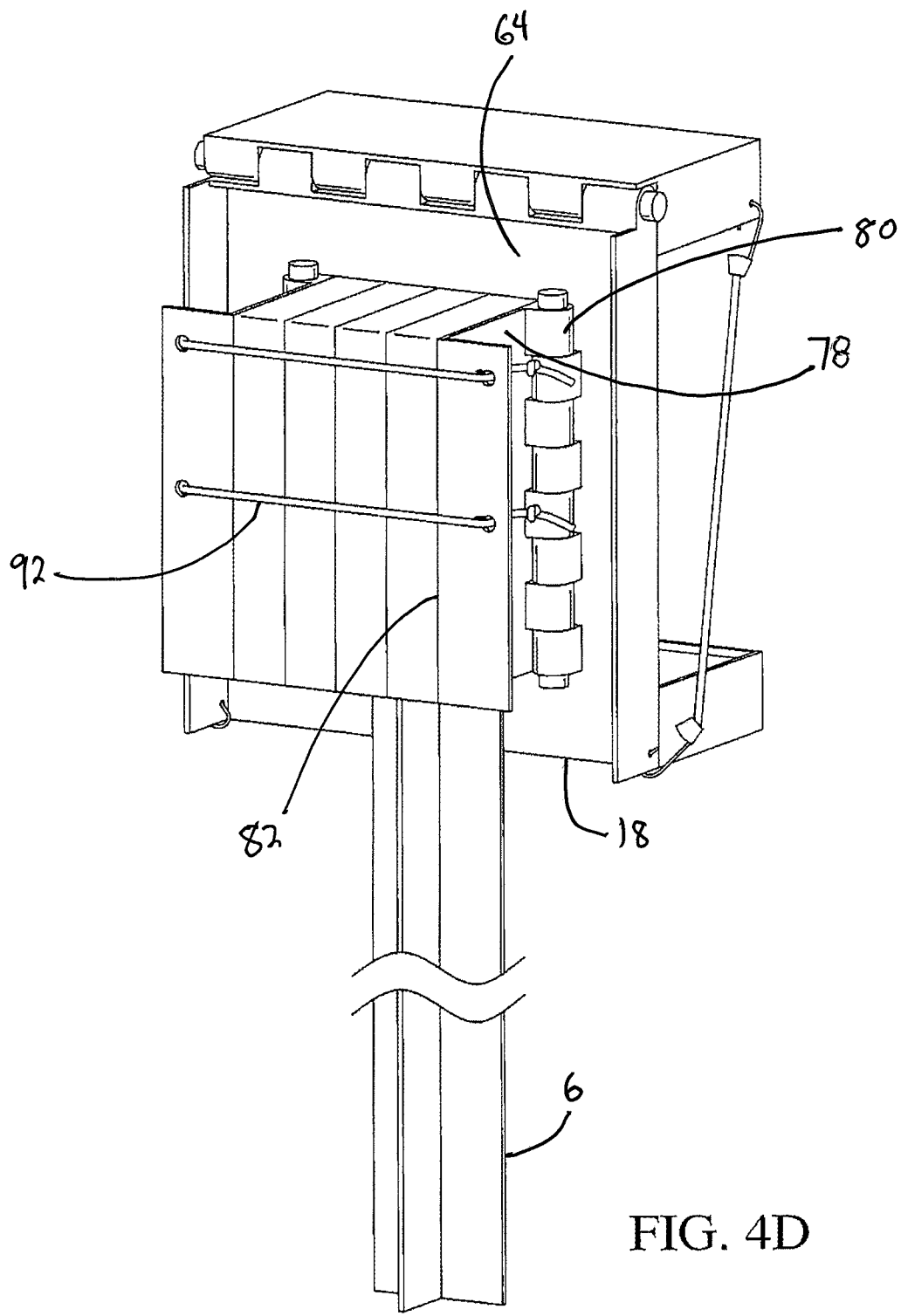
Figure 4E:
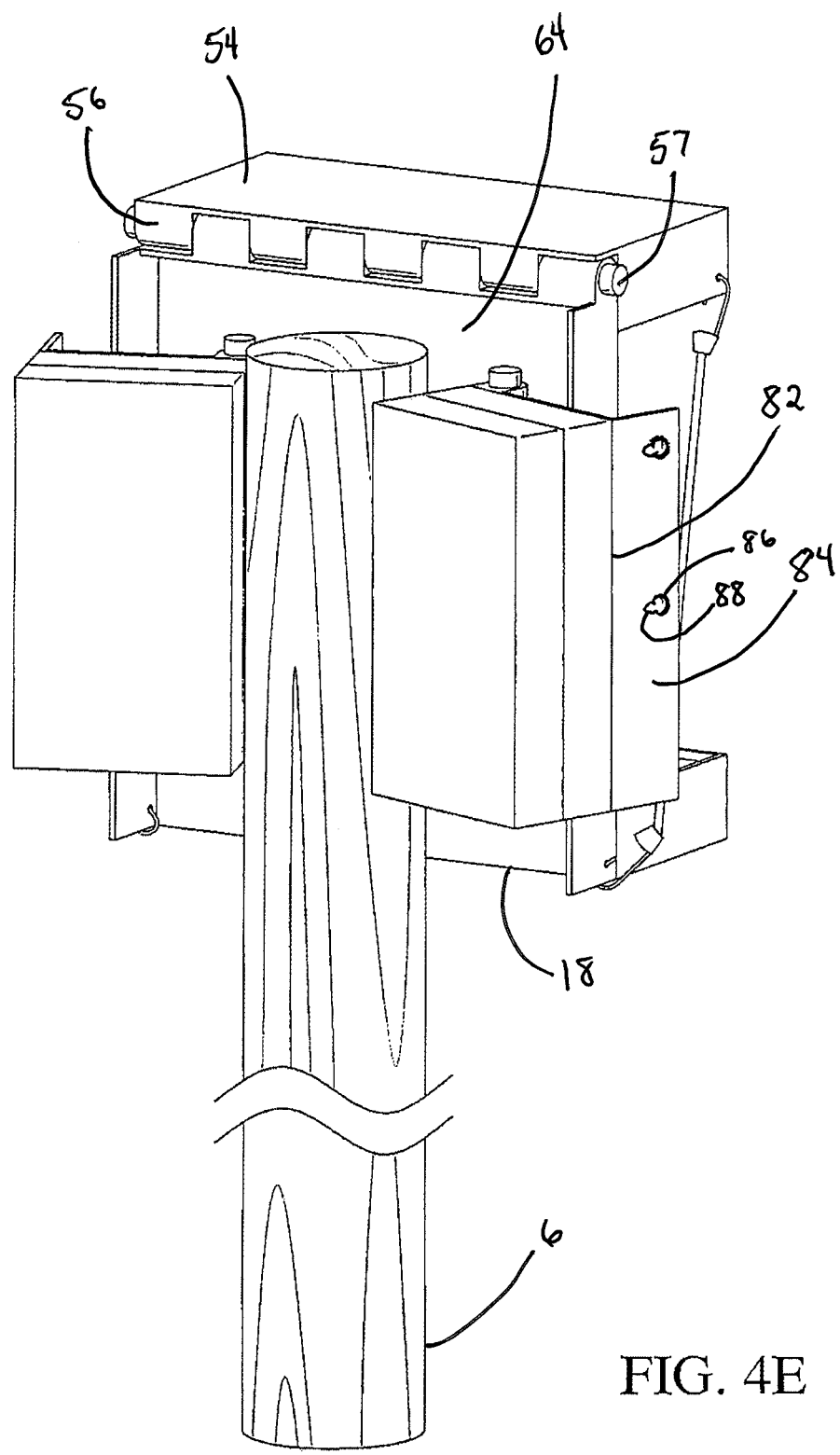
FIG. 4e is a schematic front perspective view of the camera mounting system and method, according to an embodiment, being mounted on a small diameter tree.

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, well-known structures and devices are shown in block diagram form in order to facilitate describing the claimed subject matter.

Moreover, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or." Therefore, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

As discussed in the background, among other things, current camera mounting systems carry with them a variety of deficiencies, including: being not compatible with motion-activated cameras coming in many configurations; requiring the insertion of a threaded portion of the mounting system into a wood surface, such as a tree, making mounting of a motion-activated camera on a metal structure, such as a T-post, difficult; and requiring the user to wrap a flexible element around an object, securing the flexible element to a cooperating element or to the mounting system itself, making placement of the mounting system on small diameter objects, such as small trees or T-posts, difficult or impossible.

As shown in the attached figured, at least partly in consideration of these deficiencies of conventional camera mounting systems, various embodiments of a camera mounting apparatus 10 and method are provided for mounting a camera 8 to a stanchion-like object 6 (e.g., a tree, a T-post) for positioning the camera 8 to capture images of a desired area. As noted herein, various mounting devices can be employed to position a motion activated camera 8 to capture images of a desired area.

Details of various other exemplary, non-limiting embodiments are provided below.

Camera Mounting Apparatus

According to an exemplary embodiment as shown in FIGS. 1 through 7, an apparatus for mounting a camera to a stanchion-like object 6 (e.g., a tree, a T-post) for positioning the camera 8 to capture images of a desired area is disclosed and generally referred to by the reference numeral 10.

The present invention describes an apparatus and method for mounting a camera 8. According to an exemplary embodiment, the camera mounting apparatus 10 includes a base member comprising a longitudinal, substantially rectangular body 14 positioned at a vertical height from a ground surface. The body 14 has a top 16, a bottom 18, and a first and second opposing side 20, 22. According to some embodiments, a rectangular stiffening plate is placed perpendicular to the body 14 at the top 16, bottom 18 and the first and second opposing sides 20, 22, so that a first and second stiffening plate 24, 26 are located opposite each other and are edge connected, perpendicularly to the body 14, to the first and second opposing sides 20, 22. According to some embodiments, stiffening plates may be used around the entire body 14. A cut taken through a plane parallel to the longitudinal axis 32 of the rectangular body 14 and perpendicular to a front plane 34 of the body 14 would reveal a C-shaped structure of body 14 and the first and second stiffening plates 24, 26.

According to an embodiment, about the bottom 18 of the front plane 34 of the body 14 is attached a variable height base 36. The variable height base 36 is essentially a rectangular box with no top portion having a bottom surface (not shown), a rear wall 40, a front wall 42 and a first and second side wall 44, 46. The walls of the variable height base 36 are of a low-height, in that the height of the walls preferably ranges from 1 inch to 2 inches. According to some embodiments, the walls may range in height from 0.5 inches to 3 inches. According to even further embodiments, the walls may range in height from 0.25 inches and 4 inches. High compression foam 48 is contained in the unenclosed box for supporting a camera 8 at a predetermined height above the ground 4. The high compression foam 48 can consist of a neoprene material, a high-density polystyrene, or any other suitable high compression foam-like material that can withstand the heat and cold of weather in an outdoor environment.

According to an embodiment, the variable height base 36 would have a plurality of holes (not shown) in the bottom surface to permit the drainage of water when the camera mounting apparatus 10 is used in wet conditions.

Figure 5A:
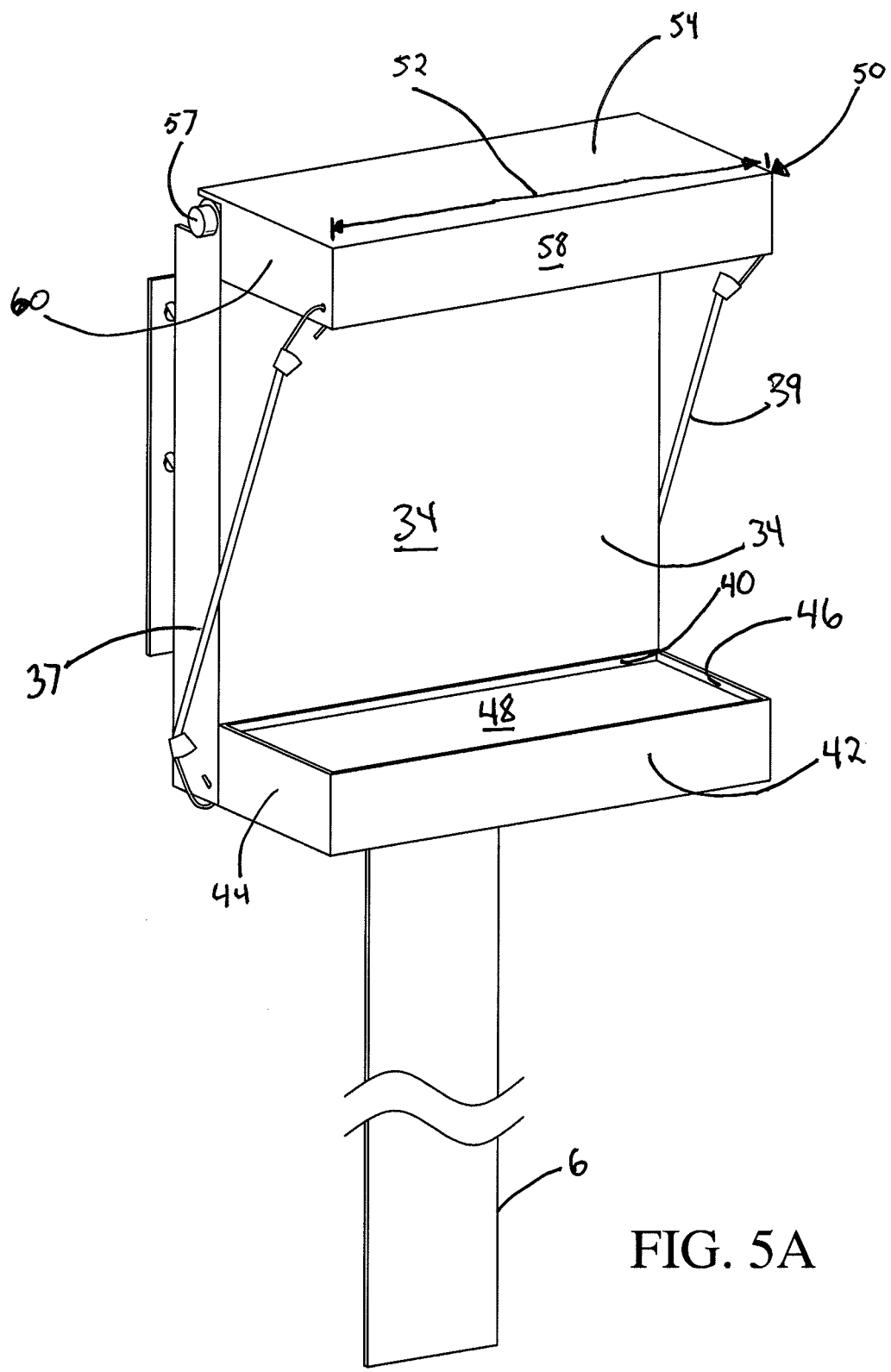
FIGS. 5a through 5b are a series of schematic front perspective view of the camera mounting system and method according to an embodiment, illustrating movement of the lower support plate being positioned in order that the mounting system is able to accept a motion-activated camera of certain dimensions.
Figure 5B:
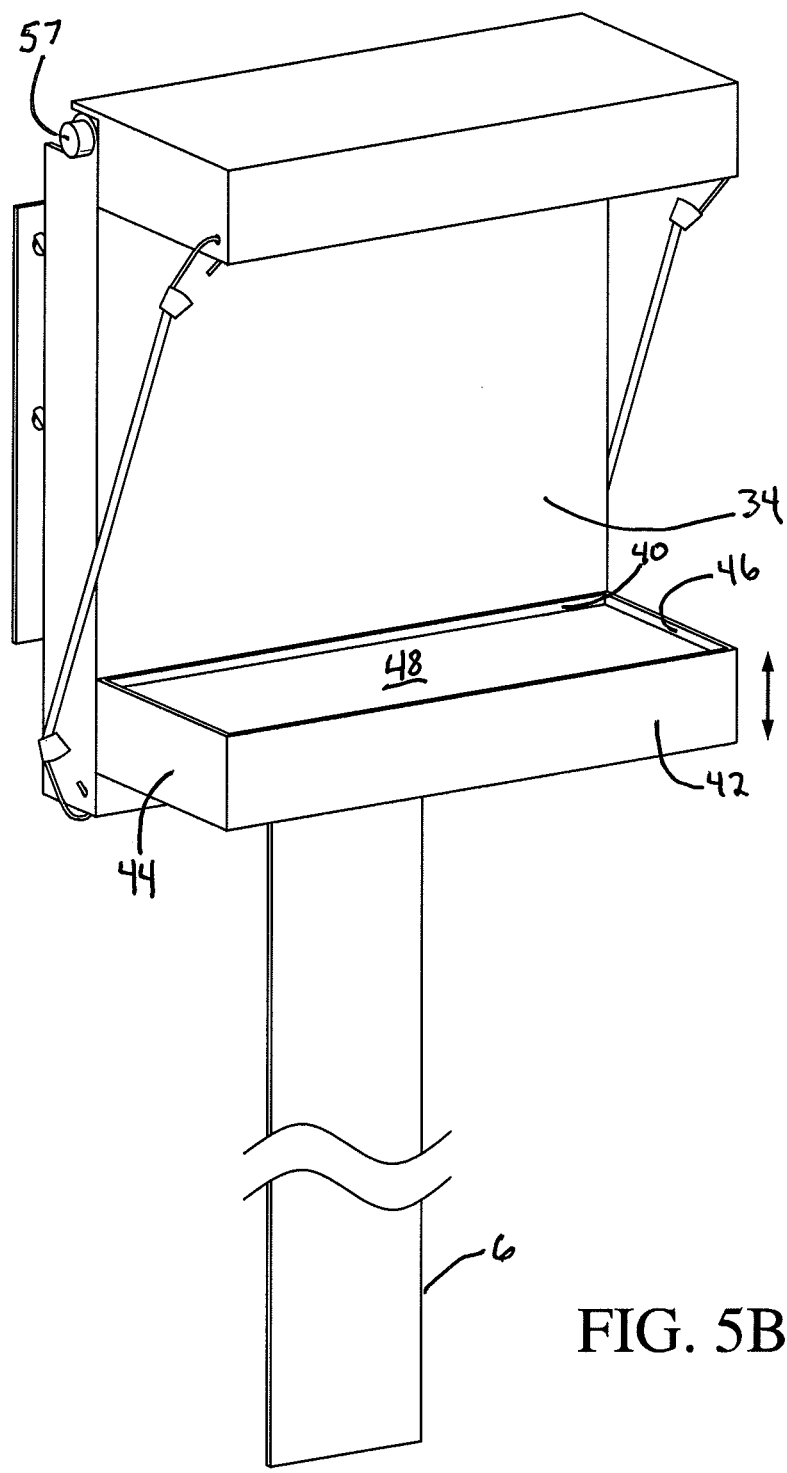
Figure 6A:
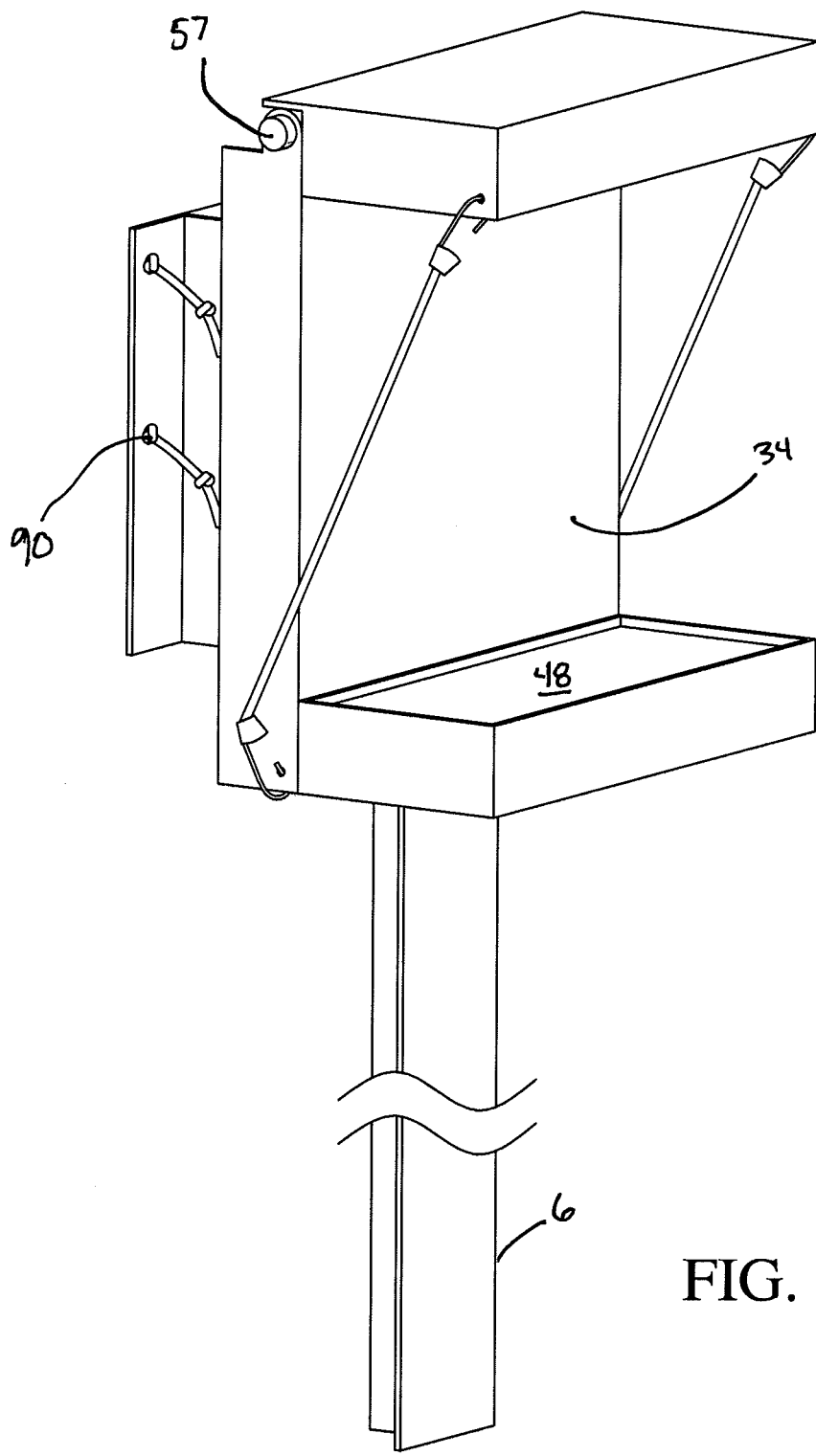
FIGS. 6a through 6d are a series of schematic front perspective views of the camera mounting apparatus and method according to an embodiment, illustrating a method for installing a motion activated camera into the apparatus.
Figure 6B:
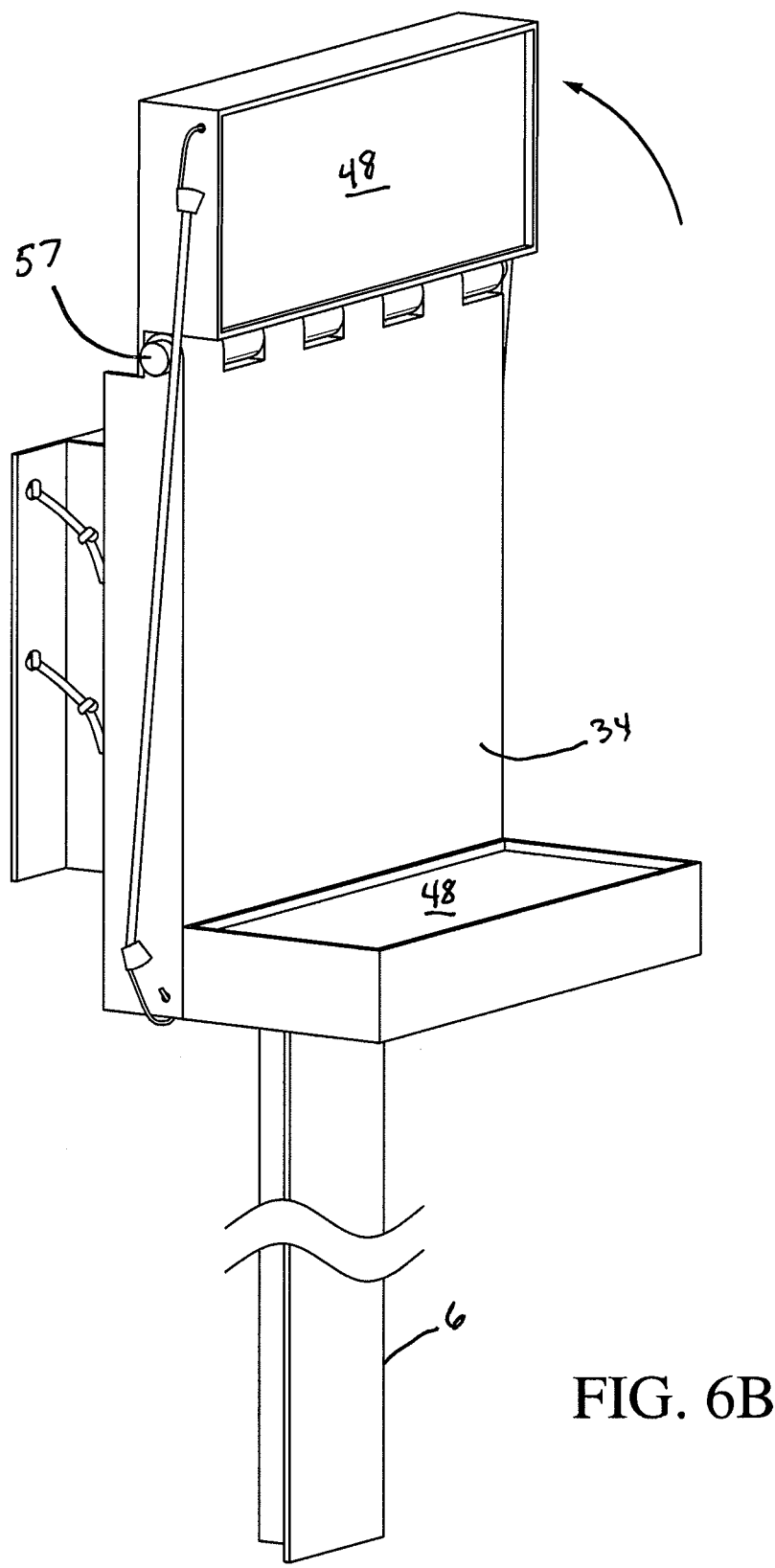
Figure 6C:
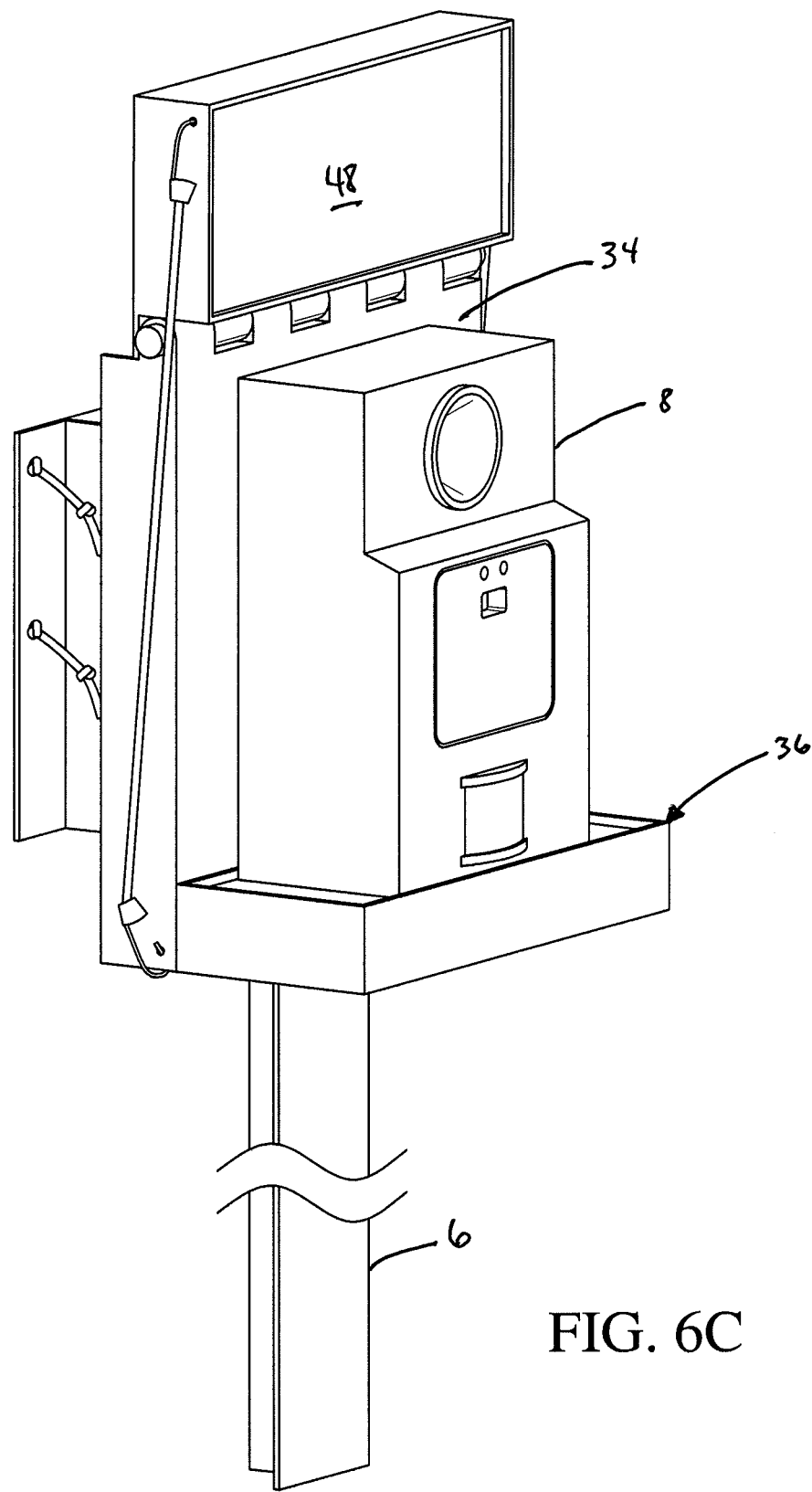
Figure 6D:
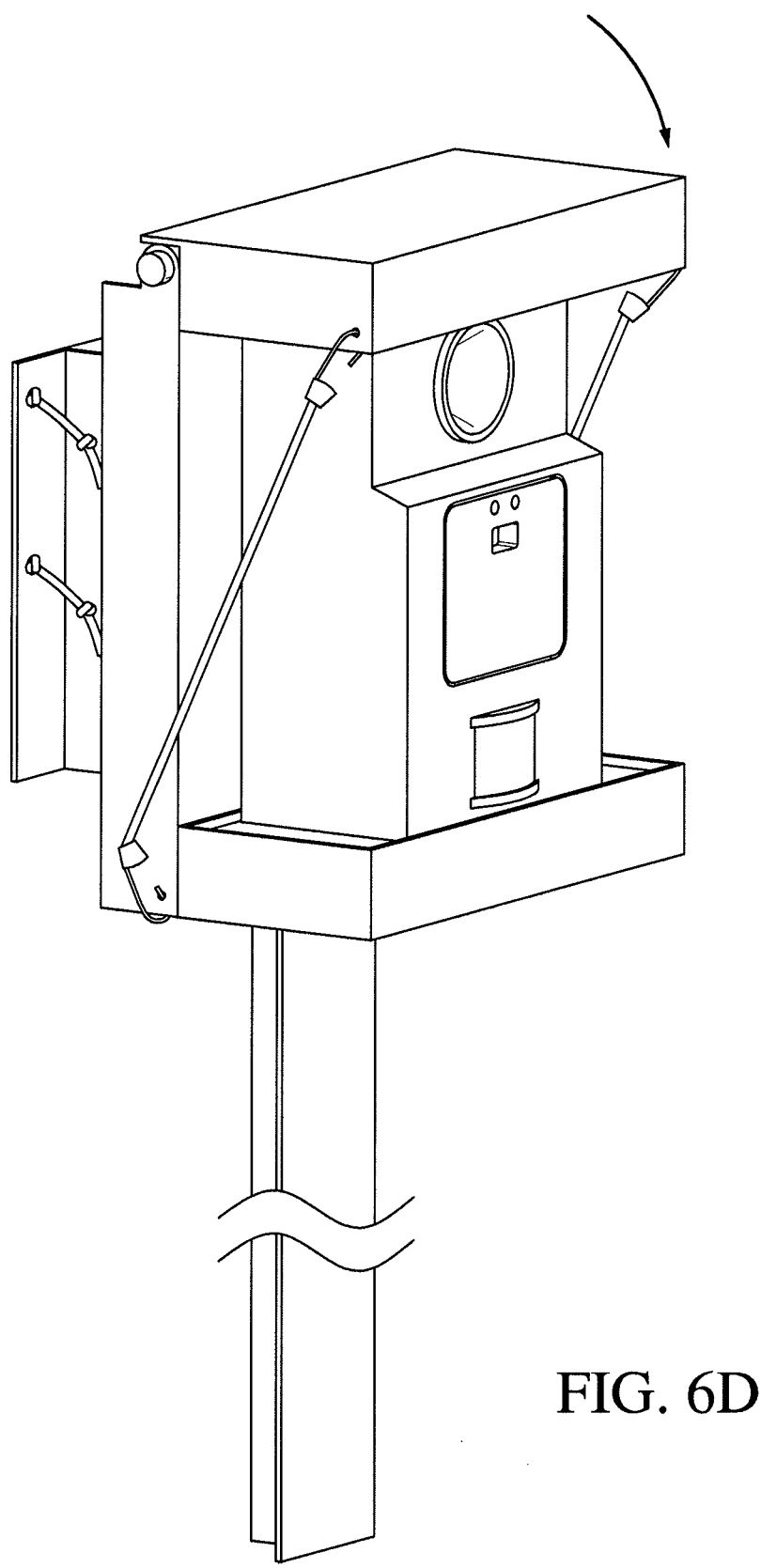
Figure 7:
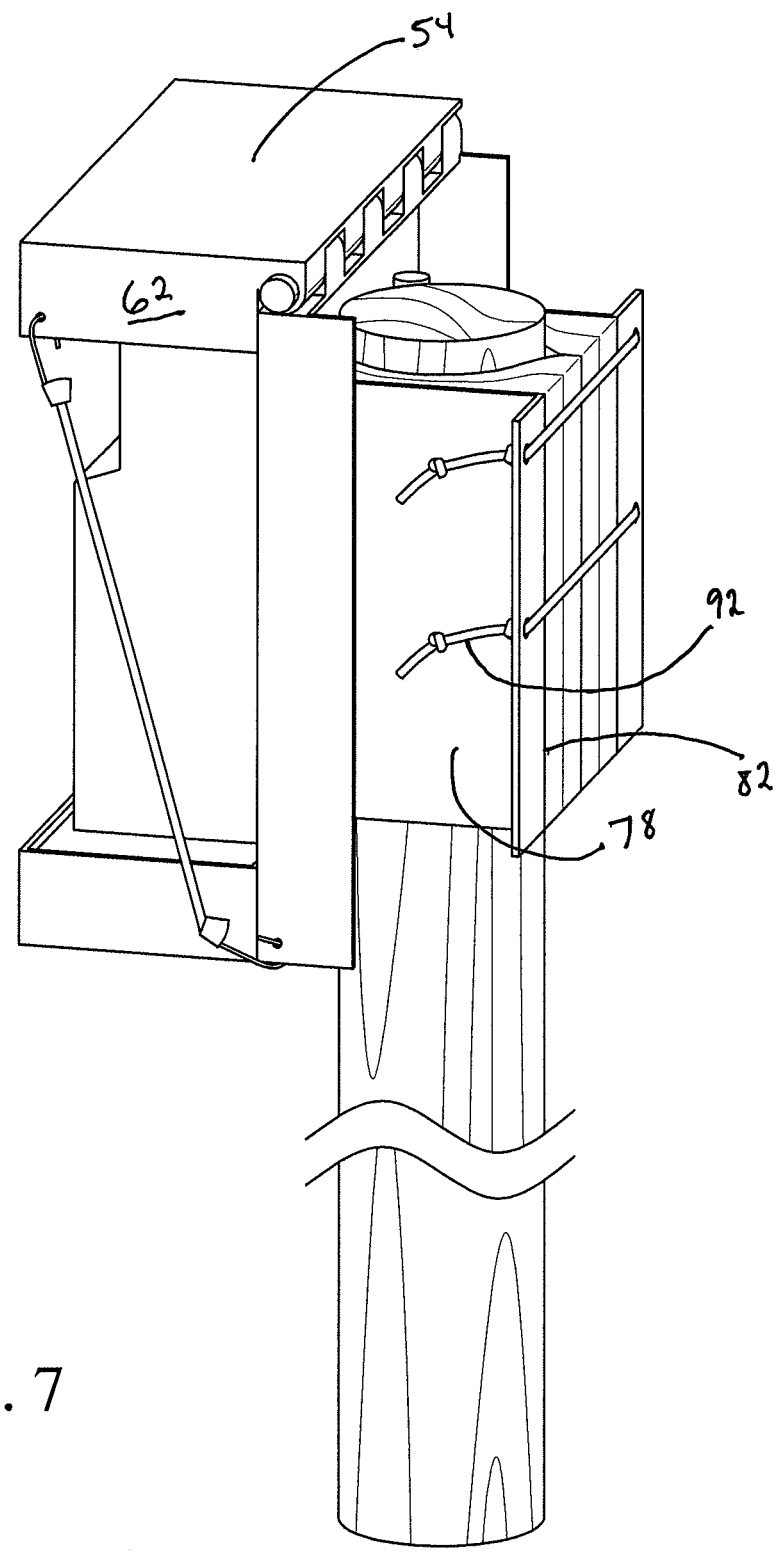

As shown in FIGS. 5A and 5B, according to an embodiment, the variable height base 36 is slidably attached to the front plane 34 of the body 14, such that the variable height base 36 can be slide up and down in relation to the level of the ground 4 beneath the body 14. The front plane 34 includes a plurality of apertures (not shown) arranged in a row about the horizontal center of the front plane 34 for receiving a locking pin (not shown) that is attached to the variable height base 36. The locking pin can comprise a straight pin, a detent pin with a cotter pin, a dowel or straight pin, a grooved or splined pin, a clevis pin, a spiral pin, a small bolt, etc. The locking pin can be retracted so that the variable height base 36 can be adjusted to a desired height. The locking pin can then be released so as to engage the nearest aperture, securing the variable height base 36 in a desired position. The number and size of apertures can vary, as can the size of the locking pin. However, the locking pin must be no larger than the apertures so as to fit within them when the locking pin is holding the variable height base 36 at a desired height.

When viewed from a side, the variable height base 36 is configured perpendicularly to the body 14, so that a camera 8 placed on the variable height base 36 would essentially be parallel to the body 14, facing away from the direction of the front plane 34.

According to an embodiment, in place of, or below, the stiffening plate on the top 16 of the body 14 is a pivoting member 50 designed to retain a camera 8 when said camera 8 is placed in the camera mounting apparatus 10. The pivoting member 50 comprises a rectangular box with no top, much like the variable height base 36, that is secured upside down to the top of the base member with a hinge apparatus. It is secured to the apparatus 10 by a first and second elastic strap 37, 39 that urges the pivoting member toward the variable height base 36. In this case, however, the pivoting member 50 has a width 52 that matches the width of the body 14 taken on a perpendicular plan to the longitudinal axis of the body. The pivoting member 50 has a base 54, a rear member 56, a front member 58 and a first and second side member 60, 62. The members (e.g., sidewalls) of the pivoting member 50 are of a low-height, in that the height of the members preferably ranges from 1 inch to 2 inches. According to some embodiments, the members may range in height from 0.5 inches to 3 inches. According to even further embodiments, the members may range in height from 0.25 inches and 4 inches. High compression foam 48 is contained in the pivoting member 50 for supporting a top of the camera 8, securing it within the camera mounting apparatus 10, at a height predetermined by the height of the variable height base 36. As with the variable height base 36, the high compression foam 48 can consist of a neoprene material, a high-density polystyrene, or any other suitable high compression foam-like material that can withstand the heat and cold of weather in an outdoor environment. At the intersection of the base 54 and the rear member 56 is located a hinge mechanism 57 for rotatably positioning the pivoting member 50 at the top of the body 14, such that a left-side view of the device would resemble the letter "C," such as in FIG. 2.

The body 14 has a rear surface 64 opposite the front plane 34 according to an embodiment. The rear surface 64 contains an attachment apparatus 66 for attaching the body 14 to a tree, stanchion or other object having a diameter limited to approximately 7 inches (e.g., a stanchion-like object 6). In some embodiments, the diameter of the stanchion-like object 6 may be in the range of 5 to 8 inches. In some even further embodiments, the diameter of the object 6 could be in the range from 3 inches to approximately 8 inches. Finally, in some embodiments, the diameter of the object 6 could be in the range of 1 inch to 8 inches.

According to an embodiment, the attachment apparatus 66 attaches to the rear surface 64 of the body 14 and includes a first and second hinged grasping components 70, 72 that work in combination with each other. Each of the first and second hinged grasping components 70, 72 have an elongated rectangular base plate 74 with a front plate surface 76 and a back plate surface 78, opposite the front plate surface 76. On the back plate surface 78, a hinging mechanism 80 is attached along one of a longitudinal side of the back plate surface 78. The location of the hinging mechanism 80 can also be on the opposite longitudinal side, depending on which of the first and second hinged grasping components 70, 72 are being discussed. On the longitudinal edge 82 opposite the hinging mechanism 80 is located a perpendicular flange 84 so that, if viewed on a longitudinal axis of the elongated rectangular base plate 74, the perpendicular flange 84 would form approximately a 90 degree angle with back plate surface 78 of the elongated rectangular base plate 74. The perpendicular flange 84 contains at least one aperture 86 specially designed with a much smaller, companion aperture 88 along the edge of the at least one aperture 86, where the at least one aperture 86 receives a knot 90 or ball (not shown) attached to an elastic band 92 and the companion aperture 88 then receives the elastic band 92 when the user slides the elastic band 92 into the companion aperture 88. In this configuration, the knot 90 or ball attached to the elastic band 92 is held in place by the perpendicular flange 84, as the smaller aperture's diameter is only so large as to allow the elastic band 92 to pass through. According to an embodiment, the perpendicular flange 84 may contain multiple apertures with companion apertures in communication therewith.

On the front plate surface 76 of the first hinged grasping component 70 is attached a highly compressible foam 94 of a desired thickness, according to an embodiment. The highly compressible foam 94 can consist of a neoprene material, a high-density polystyrene, or any other suitable high compression foam-like material that can withstand the heat and cold of weather in an outdoor environment. The thickness of the highly compressible foam 94 is selected based on the diameter of the stanchion-like object 6 to which the camera mounting apparatus 10 is to be mounted. In some cases, multiple layers of highly compressible foam 94 may be needed in order to mount the camera mounting apparatus 10 to a stanchion-like object 6 having a particular diameter.

According to an embodiment, a first hinged grasping component 70 is oriented so that the longitudinal axis of the component is parallel to the longitudinal axis of the body 14, and the hinging mechanism 80 of the first hinged grasping component 70 is located on the rear surface 64 of the body 14 at a height so that the first hinged grasping component 70 is equally spaced between the top 16 and the bottom 18 of the body 14. The first hinged grasping component 70 is configured so that, when unhinged and rotated so that the back plate surface 78 of the first hinged grasping component 70 is facing a rear surface 64 of the body 14, the highly compressible foam 94 of the first hinged grasping component 70 faces opposite the back plate surface 78 of the first hinged grasping component.

According to an embodiment, a second hinged grasping component 72 is oriented so that the longitudinal axis of the mechanism is parallel to the longitudinal axis of the body 14 and the hinge mechanism of the second hinged grasping component 72 is located on the rear surface 64 of the body 14 at a height equal to that of the first hinged grasping component 70. The second hinged grasping component 72 is located in a space apart configuration from the first hinged grasping component 70. The second hinged grasping component 72 is configured so that, when unhinged and rotated opposite the first hinged grasping component 70 so that the back plate surface of the second hinged grasping component 72 is facing the rear surface 64 of the body 14, the highly compressible foam 94 of the second hinged grasping component 72 faces opposite the back plate surface 78 of the second hinged grasping component 72.

As shown in FIGS. 4A through 4E according to an embodiment, in this configuration, two hinged grasping components are configured to grasp and surround a stanchion-like object 6 with highly compressible foam 94, and be locked together using one or more elastic bands 92 having knots 90 or balls mounted on them, so that the camera mounting apparatus 10 is secured on the object 68 at a desired height above the ground 4, and will remain secured at that desired height until the elastic bands 92 are removed and the first and second hinged grasping components 70, 72 are released from the object 68.

Camera Mounting Method

According to an embodiment as shown in FIGS. 6A through 6D and FIG. 7, in use, an operator of the camera mounting apparatus 10 would pivot upwards (e.g., to open) the pivoting member 50, adjust the variable height base 36 to the support the height of the camera 8, place a bottom of the camera 8 on the variable height base 36, tip the camera 8 toward the body 14 of the camera mounting apparatus 10, and pivot downwards the pivoting member 50. With the camera 8 installed in the camera mounting apparatus 10, the operator would then select a suitable location for the camera 8 and either located a small diameter (e.g., between 1 inch and 7 inches in diameter) stanchion-like object 6, such as a tree. If no such object is available, the operator may install a T-post 96, or similar post, into the ground 4 so that the T-post 96 is located at the point where the operator wishes to position the camera 8.

According to an embodiment, the operator would then open the first and second hinged grasping components 70, 72 of the attachment apparatus 66 by pivoting the first hinged grasping component 70 away from the second hinged grasping component 72, thereby forming a space between the first and second hinged grasping components 70, 72. The T-post would then be positioned between the first and second hinged grasping components 70, 72 (e.g., in the space formed) and the first and second hinged grasping components 70, 72 would be pivoted towards each other, so that the highly compressible foam 94 would surround the T-post 96 and hold the camera mounting apparatus 10 in place above the ground 4. In order to secure the first and second hinged grasping components 70, 72 towards each other in order to maintain the friction necessary to secure the camera mounting apparatus 10, one or more elastic bands 92 having a plurality of knots 90 or attached balls would be employed, such that a knot 90 or ball on one end of the elastic band 92 is pulled through an aperture in the first hinged grasping component 70, and slid into the companion aperture 88 thereby preventing the elastic band 92 from sliding out of the aperture 86. A knot 90 or ball on the opposite end of the elastic band 92 would then be pulled through an aperture 86 in the second hinged grasping component 72, and slid into the companion aperture 88 thereby preventing the elastic band 92 from sliding out of the aperture 86. In this way, the elastic band 92 would urge both first and second hinged grasping components 70, 72 towards each other.

The word "exemplary" is used herein to mean serving as an example, instance, or illustration. For the avoidance of doubt, the subject matter disclosed herein is not limited by such examples. In addition, any aspect or design described herein as "exemplary" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used in either the detailed description or the claims, for the avoidance of doubt, such terms are intended to be inclusive in a manner similar to the term "comprising" as an open transition word without precluding any additional or other elements.

In view of the exemplary apparatus and methods described supra, methodologies that may be implemented in accordance with the disclosed subject matter will be better appreciated with reference to the flowcharts of the various figures. While for purposes of simplicity of explanation, the methodologies are shown and described as a series of blocks, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methodologies described hereinafter.

While the various embodiments have been described in connection with the preferred embodiments of the various figures, it is to be understood that other similar embodiments may be used or modifications and additions may be made to the described embodiment for performing the same function without deviating therefrom. Therefore, the present invention should not be limited to any single embodiment, but rather should be construed in breadth and scope in accordance with the appended claims.

What is claimed is:

1. A camera mounting apparatus for supporting a camera, comprising: a base member, the base member being substantially rectangular in shape, the base member having a front plane, a back plane, a top, a bottom and a first and second opposing side; a base attached to the front plane of the base member, the base comprising a rectangular box with no top portion and low-height sidewalls, the base having a bottom surface, a rear wall, a front wall and a first and second side wall; a pivoting member connected to the top of the base member about the intersection of the base and rear member of the pivoting member with a hinge apparatus, the pivoting member comprising an upside-down rectangular box with no top portion and low sidewalls, the pivoting member being able to pivot between an open position where the pivoting member is rotated up and backwards in relation to the base and a closed position where the pivoting member is rotated forward and down in relation to the base; an attachment apparatus mounted to the back plane of the base member, the attachment apparatus comprising two rectangular gripping elements mounted to the back plane each with its own hinging mechanism, the two rectangular gripping elements mounted in a spaced-apart vertical orientation on the back plane of the base member, the two rectangular gripping elements each having a base plate which interconnects with the hinging mechanism at one edge to be pivoted toward and away from the back plane of the base member, the base plate having a front plate surface and a back plate surface, the front plate surface having a portion of highly compressible foam mounted thereon; at least one elastic band for urging the two rectangular gripping elements together, the elastic band having knots in it at various points upon its length, the knots being received by at least two apertures, one located on each rectangular gripping element, so that a knot at one end of the elastic band can fit into one of the at least two apertures located on a first of the two rectangular gripping elements, where the elastic band be urged into a second, much smaller aperture adjacent and in cooperation with the one of the at least two apertures such that the knot is secured in place by the smaller aperture, where a knot on the other end of the elastic band is pulled through a second of the at least two apertures located on a second of the two rectangular gripping elements and urged into a second, much smaller aperture adjacent and in cooperation with the second of the at least two apertures such that the knot is secured in place by the smaller aperture; and wherein the elastic band had been pulled taut before securing the other end of the elastic band to the second of the two rectangular gripping elements.

2. The camera mounting apparatus of claim 1 further comprising the base member having apertures through the front plane and the back plane for receiving a pin from the base attached to the front plane in a vertically sliding arrangement such that the base is able to be moved to a desired vertical location and be secured in that location by placing a pin through the base and into one of the apertures.

3. The camera mounting apparatus of claim 1 further comprising the base being of a variable height for adjustment up and down.

4. The camera mounting apparatus of claim 1 further comprising the base having one or more apertures in its bottom surface.

5. The base of claim 3, further comprising a plurality of clips mounted on an outside surface on the rear wall of the base such that the clips are configured to engage a plurality of slots arranged at varying heights through the front plane and the back plane of the base member, so that the clips are engaged in those slots desired to place the base at a height desirable to the user.

6. The camera mounting apparatus of claim 1 further comprising the base containing high compression foam in the space bounded by the bottom surface, the rear wall, the front wall and the first and second side walls.

7. The camera mounting apparatus of claim 1 further comprising the pivoting member containing high compression foam in the space bounded by the base, the rear member, the front member, and the first and second side members.

8. A camera mounting apparatus for supporting a camera, comprising: a base member, the base member being substantially rectangular in shape, the base member having a front plane, a back plane, a top, a bottom and a first and second opposing side; a base attached to the front plane of the base member; a pivoting member connected to the top of the base member about the intersection of the base and rear member of the pivoting member with a hinge apparatus; an attachment apparatus mounted to the back plane of the base member, the attachment apparatus comprising two rectangular gripping elements mounted to the back plane each with its own hinging mechanism, the two rectangular gripping elements mounted in a spaced-apart vertical orientation on the back plane of the base member, the two rectangular gripping elements each having a base plate which interconnects with the hinging mechanism at one edge to be pivoted toward and away from the back plane of the base member, the base plate having a front plate surface and a back plate surface, the front plate surface having a portion of highly compressible foam mounted thereon; at least one elastic band for urging the two rectangular gripping elements together; wherein base receives the bottom of a motion activated camera and the pivoting member secures the top of said camera in the apparatus; and wherein the two rectangular gripping elements are mounted around a stanchion-like object so that the high compressible foam engages and grips the stanchion-like object and the two rectangular gripping elements are secured together with the elastic band.

9. The camera mounting apparatus of claim 8 further comprising the base member having apertures through the front plane and the back plane for receiving a pin from the base attached to the front plane in a vertically sliding arrangement such that the base is able to be moved to a desired vertical location and be secured in that location by placing a pin through the base and into one of the apertures.

10. The camera mounting apparatus of claim 8 further comprising the base being of a variable height for adjustment up and down.

11. The camera mounting apparatus of claim 1 further comprising the base having one or more apertures in its bottom surface.

12. The base of claim 10, further comprising a plurality of clips mounted on an outside surface on a rear wall of a base such that the clips are configured to engage a plurality of slots arranged at varying heights through the front plane and the back plane of the base member, so that the clips are engaged in those slots desired to place the base at a height desirable to the user.

13. The camera mounting apparatus of claim 10 further comprising the base containing high compression foam in the space bounded by a bottom surface, a rear wall, a front wall and a first and second side wall.

14. The camera mounting apparatus of claim 10 further comprising the pivoting member containing high compression foam in the space bounded by a base, a rear member, a front member, a first and second side member.

15. A method for mounting a camera on a stanchion-like object, the method comprising the acts of: providing a camera mounting apparatus, comprising: a base member, the base member being substantially rectangular in shape, the base member having a front plane, a back plane, a top, a bottom and a first and second opposing side; a base attached to the front plane of the base member, the base comprising a rectangular box with no top portion and low-height sidewalls, the base having a bottom surface, a rear wall, a front wall and a first and second side wall; a pivoting member connected to the top of the base member about the intersection of the base and rear member of the pivoting member with a hinge apparatus, the pivoting member comprising an upside-down rectangular box with no top portion and low sidewalls, the pivoting member being able to pivot between an open position where the pivoting member is rotated up and backwards in relation to the base and a closed position where the pivoting member is rotated forward and down in relation to the base; an attachment apparatus mounted to the back plane of the base member, the attachment apparatus comprising two rectangular gripping elements mounted to the back plane each with its own hinging mechanism, the two rectangular gripping elements mounted in a spaced-apart vertical orientation on the back plane of the base member, the two rectangular gripping elements each having a base plate which interconnects with the hinging mechanism at one edge to be pivoted toward and away from the back plane of the base member, the base plate having a front plate surface and a back plate surface, the front plate surface having a portion of highly compressible foam mounted thereon; at least one elastic band for urging the two rectangular gripping elements together, the elastic band having knots in it at various points upon its length, the knots being received by at least two apertures, one located on each rectangular gripping element, so that a knot at one end of the elastic band can fit into one of the at least two apertures located on a first of the two rectangular gripping elements, where the elastic band be urged into a second, much smaller aperture adjacent and in cooperation with the one of the at least two apertures such that the knot is secured in place by the smaller aperture, where a knot on the other end of the elastic band is pulled through a second of the at least two apertures located on a second of the two rectangular gripping elements and urged into a second, much smaller aperture adjacent and in cooperation with the second of the at least two apertures such that the knot is secured in place by the smaller aperture; and wherein the elastic band had been pulled taut before securing the other end of the elastic band to the second of the two rectangular gripping elements; pivoting the pivoting member upwards and inserting the camera into the camera mounting apparatus so that a bottom of the camera rests in the base and a top of the camera is secured by pivoting the pivoting member downwards; locating the two rectangular gripping elements around a stanchion-like object so that the first of the two rectangular gripping elements is positioned on one side of the stanchion-like object and the second of the two rectangular gripping elements is located on the opposite side of the stanchion-like object; urging together the two rectangular gripping elements so that the highly compressible foam engages and grips the stanchion-like object so that the camera mounting apparatus will not slide down the stanchion-like object; and securing the two rectangular gripping elements to one another to maintain the engagement between the highly compressible foam and the stanchion-like object.

16. The method of claim 15, further comprising the act of locating the stanchion-like object in an area where the operator would like to capture photographs or video.

* * * * *